US006227903B1

(12) United States Patent
Horton

(10) Patent No.: US 6,227,903 B1
(45) Date of Patent: May 8, 2001

(54) CIRCUIT CONNECTOR BLOCK

(76) Inventor: Robert F. Horton, 325 County Rd. 308, Cullman, AL (US) 35057

(*) Notice: Subject to any disclaimer, the term of this patent is extended or adjusted under 35 U.S.C. 154(b) by 0 days.

(21) Appl. No.: 09/322,785

(22) Filed: May 28, 1999

Related U.S. Application Data

(63) Continuation of application No. 08/727,827, filed on Sep. 6, 1996, which is a continuation-in-part of application No. 08/349,204, filed on Dec. 5, 1994, now Pat. No. 5,558,536.

(51) Int. Cl.[7] .......................... H01R 13/60; H01R 13/66; H01R 29/00; H01R 9/22; H02B 1/056

(52) U.S. Cl. ............................ 439/535; 439/49; 439/709; 439/814

(58) Field of Search ............................. 439/535, 49, 709, 439/810, 814, 721, 722, 723, 724; 200/51.03, 51.06

(56) References Cited

U.S. PATENT DOCUMENTS

| | | | | |
|---|---|---|---|---|
| Re. 31,033 | * | 9/1982 | Wilson, Jr. et al. | 439/724 X |
| 2,917,724 | * | 12/1959 | Jackson | 439/721 OR |
| 3,848,224 | * | 11/1974 | Olivero | 439/721 OR |
| 4,875,871 | * | 10/1989 | Booty, Sr. et al. | 439/535 X |

* cited by examiner

*Primary Examiner*—Paula Bradley
*Assistant Examiner*—Edwin A. León
(74) *Attorney, Agent, or Firm*—C. A. Phillips

(57) ABSTRACT

A 110-volt wiring connector wherein sets of wire connectors are positioned on each of four sides, each set of the sets of 1–4 having three in-line electrodes as connectors, corner electrodes are interconnected, and the center electrodes are bridged as between the first set and second set and as between the first set and fourth set.

4 Claims, 6 Drawing Sheets

CIRCUIT CONNECTOR BLOCK

CROSS REFERENCE OF RELATED APPLICATION

This application is a continuation of application Ser. No. 08/727,827, filed Sep. 6, 1996, which is a continuation-in-part of application Ser. No. 349,204, filed Dec. 5, 1994 now U.S. Pat. No. 5,558,536.

FIELD OF THE INVENTION

This invention relates generally to wiring subsystems for buildings and particularly to one which is typically encased in an electrical junction box and in which the subsystem typically interconnects wire connected elements or circuits.

BACKGROUND OF THE INVENTION

It has long been a practice to control a 110-volt electrical outlet or set of outlets from multiple, usually two, spaced switches, for example, switches being at the bottom and top of stairs between floors of a building by which illumination can readily be controlled at the two levels. This is termed three-way (two switches) switching.

Applicant is aware of two general types of connective systems to effect the necessary connections, one being the widely used, and thus conventional, system of making each desired connection by twisting wires together and covering them with a wire nut. The other type system is one which employs what is termed a modular connector. The applicant found reference to such modulator connectors only in the patent art, is exemplified by U.S. Pat. Nos. 4,820,197, issued Apr. 11, 1989, and 4,875,871, issued Oct. 24, 1989. It is believed that by virtue of their cost and complexity, applicant has not, now more than four years latter, found them available to the electrical trade. They simply have not been found to be a viable option for the wiring of buildings which, of course, is the field to which the present invention is directed.

Conventionally, to effect three-way switching, at least four power cables are connected in an electrical junction box, one bringing power in, a second cable extending to and connected to one switch, a third cable extending to and connected to a second switch, and a fourth cable bringing power out to a light or lights. Sometimes where there are two lights, the lights are separately connected by a cables to the junction box, thus requiring that five cables be interconnected. Further, where, as is often the case, it is desired to extend unswitched conductors, as to a wall outlet, a sixth cable is inter-conductor connected in the junction box.

Significantly, each of the cables has three conductors, and as a first step, each cable is passed through a cable opening in the junction box. Then each is pulled outward from the interior of the junction box with the top (or bottom) cover of it removed. Next, the ends of the conductors are stripped of insulation. After this, particular conductors are twisted together and wire nuts semi-screwed (there are no male threads) on. Next, the conductors are stuffed back into the junction box. Finally, the cover is replaced on the junction box, making it a full enclosure. Such junction boxes, square or round, typically have a side-to-side dimension of only four inches or less, making the stuffing event difficult, and worse, frequently the stuffing applies forces to the twisted joints which loosens them.

U.S. Pat. No. 4,106,835, issued on Aug. 15, 1978, outlines in part this procedure and discusses certain of the problems encountered with it, with which the applicant concurs:

"In practice, electrical wires are connected by the use of electrical wire nuts. The connected wires and the attached wire nuts are then crammed into a junction box. Wire nuts must be of a size to receive therein the end portions of the number of the wires to be connected together and frequently at least three wires require connection. Wire nuts are of a size to cause the local connection to have considerable bulk. There is also the element of costly time involved in connecting the end portions of wires or in changing connections, and difficulty is frequently experienced in initially connecting wires or in removing the same from a junction box for changing connections."

It is significant that the employment of wire nuts, which goes back to a day prior to the '835 patent, supplanted taping of the twisted joints with an insulating tape. The basic role of the tape was to provide insulation and thus prevent shorting between wiring connections within the electrical box. The problem asserted with respect to the insulating tape was that following the stuffing event, an imperfect connection might occur or persist within the tape and, of course, unseen, could result in heat, burn, and thus present a significant fire hazard. As a result, wire nuts were adopted, these having an outer plastic or Bakelite™ construction, these performing both an insulation function and effecting some securing function to lessen the probability of loosening of twisted wires by stuffing. Further, wire nuts were claimed to be less likely to deteriorate or be destroyed in the presence of heat.

Despite the better insulation feature of wire nuts and the fact that their rigidity would seem to be protective of the integrity of a twisted wire joint they encased and prevent "hot" joints, they remained suspect and unpopular. This is believed to be in part because while the term "nut" suggested a secure fitting, in fact, there was no such security as there typically occurs slippage between twisted wires and the minimum threads of a wire nut.

This is not to say that substitutes for wire nuts have not been suggested by the prior art, particularly in the literature. Thus, the '835 patent describes a terminal block which could be used to provide, positive, bolt secured interconnections as are commonly employed in certain switch boxes and circuit breakers to prevent "hot" joints. Other U.S. Pat. Nos. e.g., 1,668,111; 2,411,014; 3,546,364; and 4,547,627 offer other forms of positive connection terminal blocks.

The problem with known proposed terminal blocks is that they do not meet the clear and, applicant believes, absolute requirement demanded by the trade of providing a universal interconnection device which is simple and inexpensive to use and one that meets a high percentage of wiring installer's needs. It is submitted that the following features are needed in a device to produce an acceptable departure from the prior art:

1. that the device be readily placeable in a standard electrical junction box;
2. that the degree, compression, or inter-element force between connected elements be positively controllable by the installer to enable him to ensure that a low ohmic connection is made by the device;
3. that the device be connectable while positioned in a junction box without the necessity for its removal or the removal of connecting wires;
4. that it accommodate a power input circuit, single or multiple switching functions, a switch controlled output, and preferably a bridging, non-switched output;
5. that when installed, it be configured to enable a simple visual inspection whereby the installer may be certain that all connections are good ones and thus not likely to heat. One cannot see through a wire nut; and if removed for inspection and then replaced, some change in the position of the connected wires is to be expected. Thus, what you see is not necessarily a condition of the wires after replacement of the wire nut; and 6. that it be uniquely configured to facilitate both its functionality and the wiring of it.

It is the objective of this invention to address the problems created by the absence of combinations of the foregoing features.

A second problem relating to the wiring of buildings is that of the typical requirement that skilled electricians must make two visits to a job site, once to effect wiring at electrical boxes, and again to connect switches, wall receptacles, and light fixtures. Ideally, the second visit would be eliminated if the latter chores were performable by non-skilled workers, who are paid on the order of one-third that of skilled electricians.

Accordingly, another object of this invention is to overcome this last problem.

SUMMARY OF THE INVENTION

In accordance with this invention, an electrical terminal block would include four angularly spaced, insulated, receptacle sets which receive stripped ends of wires of cables directly inserted into selected receptacle sets without significant deformation of cable. The receptacle sets are configured progressively in steps of a loop to sequentially receive an input receptacle on side 1, to then receive two switch connection receptacles on sides 2 and 3, respectively, and provide an output in receptacles on side 4. As thus arranged, the receptacle sets are held in place by an insulated block surrounding them. Each of the receptacle sets has three in-line receptacles, a center receptacle, and two end ones, and the end ones are progressively and sequentially interconnected around the loop. One of these interconnections connects the standard ground terminals from input to output, and a connective link connects between center receptacles of the second and third sides of the connector. In addition, a conductive link connects the center receptacles on the first and fourth sides.

Further, switch and power outlet assemblies are constructed wherein there is included the combination of electrical plug-in prongs and receptacles plus screw attachments for long term security and wherein no skilled electrical installation effort is required.

DESCRIPTION OF THE PREFERRED EMBODIMENT

Figure 1:
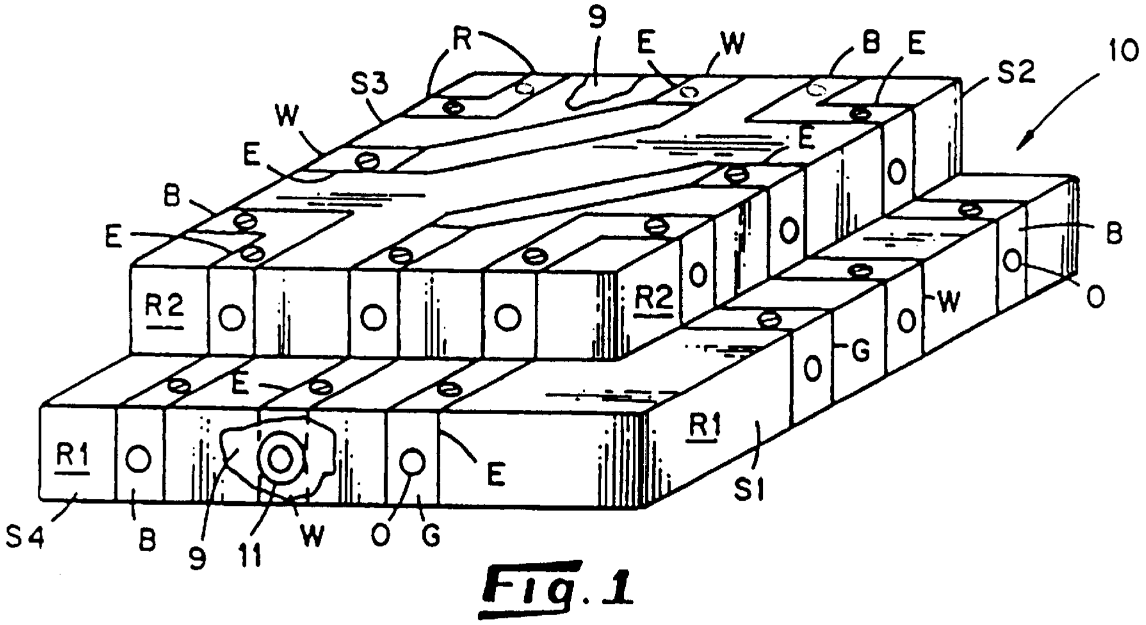
FIG. 1 is a pictorial view of a connector as contemplated by this invention with an outer insulative cover largely removed to show surfaces of electrodes.
Figure 2B:
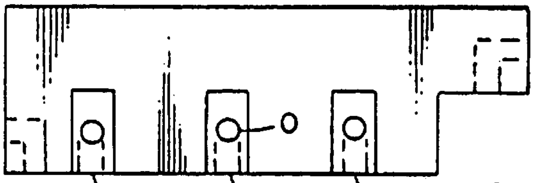
FIGS. 2*a*–2*d* are elevational views of electrode structures shown in FIG. 2.
Figure 2C:
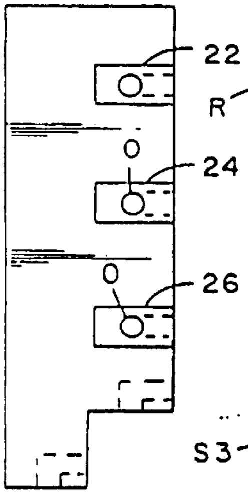
Figure 2:
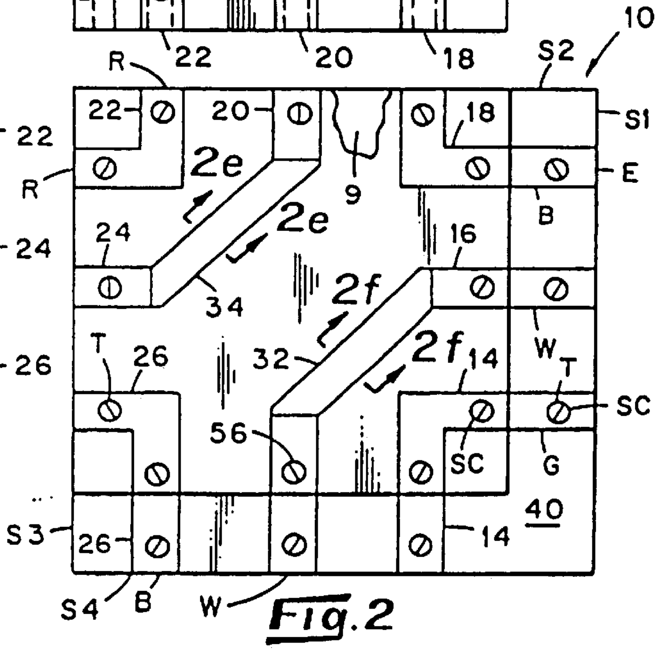
FIG. 2 is a plan view of the connector shown in FIG. 1.
Figure 3:
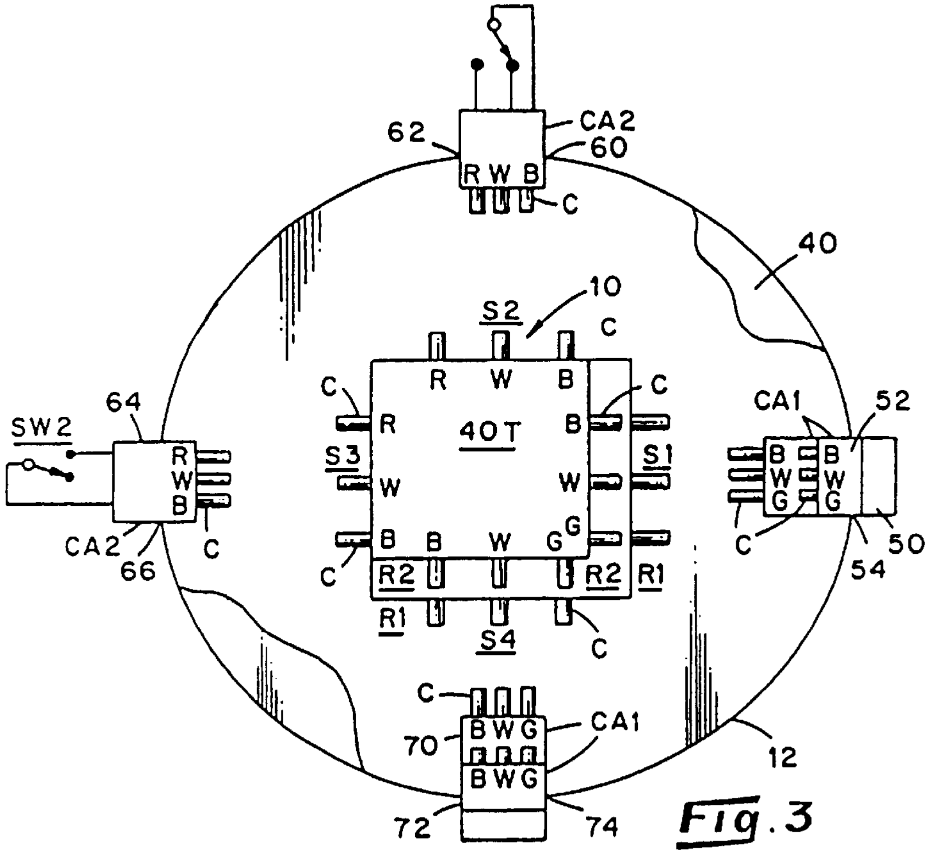
FIG. 3 is a plan view of a three-way (two switches) switching assembly, partially schematic, as contemplated by this invention.

Referring initially to FIGS. 1–3, rectangular connector 10 is constructed of electrodes E held together and insulated by a core of Bakelite™ or other insulating material 9, the top layer of which is generally cut away to expose the electrodes. The connector is configured to readily enable switched and non-switched cable interconnections and yet be configured and sized to provide a space between it and side walls of a standard size electrical junction box. Connector 10 is characterized by having four, 90-degree-spaced discrete functional sides (although it may be circular), a first, power input, side S1; a second side, switch connection, side S2; a third side, a second switch connection side, side S3; and a fourth side, being power output side S4. Each side has three electrodes E, each with at least one receptacle, or receptacle opening, O. Side S1 and side S4 have two parallel sets of receptacles O positioned in rows R1 and R2. Where connector 10 is generally covered by an insulating material 9, openings O would be in it, thus, just in front of an opening O in a receptacle electrode. Openings O, where preceded by a region of insulating covering, may be sized to either be identical with the diameter of openings in the insulating material, or larger for a discrete depth, for example, 1/16 inch. In such case, the conductor to be inserted would have part of its insulation inserted, and then the diameter of O of the electrode would thus be sufficient to receive the largest bared conductor of the cable employed. The opening O basically provides lateral guidance, and thus, for example, it may be open at the top for ease of manufacture.

Figure 1A:
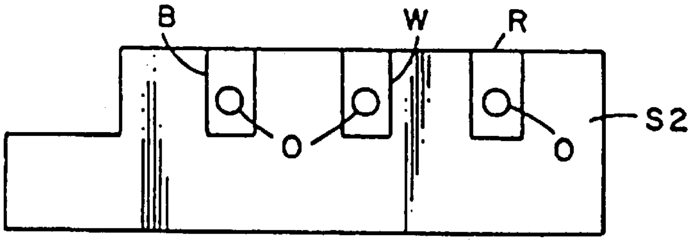
FIG. 1*a* is a rear elevational view of the connector shown in FIG. 1.
Figure 1B:
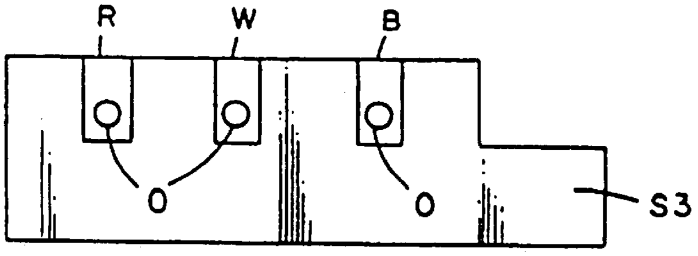
FIG. 1*b* is an elevational view and from the left side of the connector shown in FIG. 1.

The electrodes on each side are coded B, W, and G, or R as shown in FIGS. 1*a* and 1*b*, indicative of the color black, the color white, and ground or red, representative of, and like labeled, conductors of conventional three-conductor cables to which they are connected. The cables are preferably introduced at four like angularly spaced openings 54, 60, 66, and 74 of junction box 12, in the installation drawing shown in FIG. 3. Typically, as shown there, power input and output cables CA1 connected at sides S1 and S4, respectively, employ uninsulated ground conductors G and are designated B, W, and G, whereas the switched circuits connected to sides S2 and S3 employ cables CA2 wherein all conductors are insulated and thus the designations to the electrodes on sides 2 and 3 of connector 10 are B, W, and R, with the R designating, accordingly, a red insulation wire. In some instances, the third insulated wire may be green instead of red. The insulated conductors C are shown broken for clarity in FIG. 3 and are bared (not shown) of insulation where entering connector 10.

Figure 11:
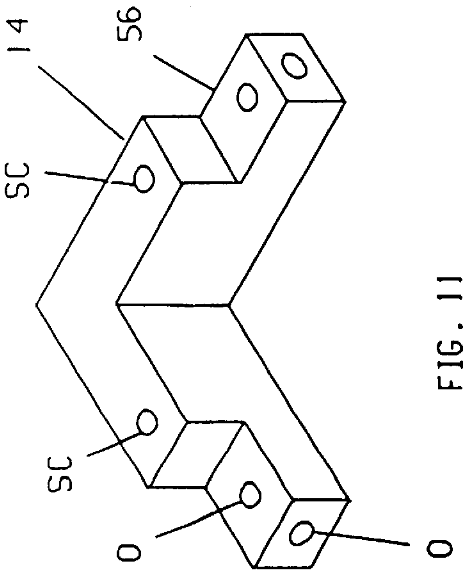
FIG. 11 illustrates the construction of a receptacle block for the corner receptacle of the connector.

FIG. 11 illustrates one form of embodiment for an electrode 18, it having an opening O and tightening screws SC for tightening a conductor C (FIG. 3).

Thus, conductor or wire connections are made by inserting a bare wire end of a conductor C (FIG. 3) into a receptacle O (FIG. 2) of an electrode E and tightening a screw SC (FIG. 2) in a threaded opening T of an electrode E, above and extending into a receptacle O, thereby a conductor C is tightened. Only representatives ones of screws SC, openings T, and electrode openings O are labelled for clarity. The molded core or core material 9 covers the electrodes with a thickness of approximately a few millimeters, having an opening 11 over each electrode opening which is larger than an opening O to initially accommodate insulation. Opening 11 may be dispensed with and only opening O of a size to accommodate bared conductors used. Thus, openings O are sized to accommodate actual bared wire ends, and openings 11, when used, are larger in size to accommodate both wire and insulation. Thereby, a conductor is inserted, leaving no exposed bared surface. Where only a bared wire is inserted, the insulation from the wire would be removed at a dimension which would position the termination of the insulation at the face of terminal block 9.

Referring to FIGS. 1–3, conductors C from a power input cable are connected to side S1 to one row (R1 or R2) of receptacles or openings O (FIG. 1), while the receptacles of the other row, above or below it, are available for bridging a three-conductor, unswitched cable to wherever needed.

The electrodes on the output side S4 (FIGS. 1, 2, and 3) also have two rows, R1 and R2, of receptacles O, enabling two switched power outputs to be connected through separate cables CA1 to separate locations.

The rear side, side S2, of connector 10 (FIG. 1*a*) has a single row of electrode receptacles O which interconnect through a: cable CA2, as schematically illustrated in FIG. 3, to a single pole, double throw switch SW1.

The left side, side S3, of connector 10 (FIG. 1*b*) also has a single row of terminal receptacles O, which connect, as schematically shown, in FIG. 3 through a cable CA2 to a second single pole, double throw switch SW2.

Figure 2A:
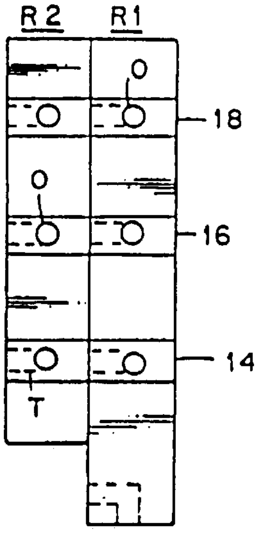
Figure 2D:
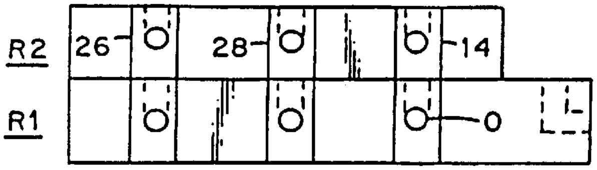
Figure 2E:
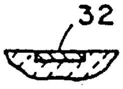
FIGS. 2*e* and 2*f* are cross-sectional views taken along line 2*e*—2*e* and 2*f*—2*f*, respectively.
Figure 2F:
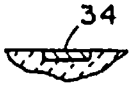

Discrete electrodes and inter-electrical couplings or links are particularly shown in FIGS. 2 and 2*a*–2*f*. They are stripped of insulating covering 9, and thus FIG. 2*a* illustrates right side elevational views of electrodes 14, 16, and 18. FIG. 2*b* shows rear side elevational views of electrodes 18, 20, and 22. FIG. 2*c* shows a left side elevational view of electrodes 22, 24, and 26. FIG. 2*d* illustrates a front side elevational view of electrodes 26, 28, and 14. Electrodes 16 and 28 are connected by conductive link 32, and electrodes 20 and 24 are connected by conductive link 34, shown in cross section in FIGS. 2*e* and 2*f*, respectively.

Alternately, the links and the electrodes they interconnect may be made into one piece.

As stated, all electrodes and links are held together by Bakelite™ or other core material 9 which covers the electrodes, except that a layer is cut away in regions other than area 9 in FIGS. 1 and 2. Finally, a cover or top 40T of an insulative material covers screws SC. Cover 42 is then connected by a screw or other means (not shown) after electrical connections are made.

As partially discussed above, FIG. 3 illustrates, partially schematically, the interconnection pattern of cables CA1 and CA2 to connector 10 for three-way (two switches) switching. Connector 10 is shown positioned in the center of a junction box 12 and may be attached, by means not shown, or unattached. Typically, one set of cable connections will hold connector 10 in a quite rigid position. As shown, there are two cables CA1, cables 50 and 52, entering through opening 54 of junction box 12 on the right side of the junction box, and the standard coding for the conductors is illustrated in terms of B for black, W for white, and G for an uninsulated ground conductor of a cable, these cables requiring no insulation for the ground conductor. The ground, G, conductor may be locally connected to a mechanical ground, such as junction box 12, as by a screw connection from electrode 14 to junction box 12 (not shown). The white, W, conductor is the actual carrier for the ground potential, and the black, B, conductor carries an alternating 110-volt potential with respect to ground (W and G).

It will be assumed that the lower of one of the cables, cable 50 (FIG. 3), provides a power input, this cable and its conductors being broken for clarity, and, with bared ends (except G, which is a bare wire), are shown in the order they enter lower row R1 receptacles of side S1 of connector block 10, bearing the same B, W, and G labels (FIG. 1). They are attached by tightening of screws SC in threaded openings T as shown in FIGS. 2 and 2*a*. Similarly, the three conductors of cable 52 are connected to the upper row, R2, of side S1 of connector 10.

As will be evident from common electrodes E for both rows R1 and: R2 in FIG. 1, conductors of cable 52 would be connected in parallel with conductors of cable 50, cable 52 providing an unswitched power output which may be employed to power circuits, such as wall plugs, a particular example being shown in FIG. 10, which are typically unswitched.

Referring to FIGS. 2, 2*a*, and 2*b*, electrode 18 connects the B, black, conductor receptacle O of side 1 to the B, black, conductor receptacle O of side S2 and only makes this one connection. It is to be kept in mind that this, the black conductor, being the normally "hot" conductor, is the one which is switched by switches SW1 and SW2 between input side 1 and output side 4 (FIG. 3). The other two inputs, W and G, are unswitched. Thus, the W designated electrode 16 is connected to the white designated electrode 28 of side S4 by conductive link 32, and the G electrode 14 is connected to both sides S1 and S4, as stated above.

Single pole, double throw switch SW1 is connected as shown (FIG. 3) through cable 60, and its insulated conductors B (black), W (white), and R (red) which, while broken for purposes of illustration, are shown entering through opening 62 of junction box 12 to like designated electrodes (FIGS. 1 and 2). Then with bared ends, the conductors are attached to receptacles O of side S2 (FIG. 2*b*) as shown and held in place by screws SC in threaded openings T in electrodes as shown in FIG. 2. Thus, and as shown in FIG. 3, conductor B of cable 60 is connected to the movable contact of switch SW1, and the W and R conductors are separately connected to the two fixed contacts of switch SW1. As will be noted, all conductors of cable 60 have insulation, and thus the third conductor is labeled R, indicating a red insulation as discussed above.

Next, cable 64, being like cable 62, has conductors B (black), W (white), and R (red), and passes through opening 66 of junction box 12, and the bared R, W, and B conductors C of this cable are connected as shown to the left side, side S3, of connector 10. The outer ends of the conductors of cable 64 are attached, as shown, to single pole, double throw switch SW2 in a like manner to the connection of switch SW1 wherein the movable contact of switch SW2 is connected to the B (black) conductor, and electrode, and the fixed contacts are connected to the red R and white W conductors and electrodes. As noted above, sides S2 and S3 are interconnected by common corner electrode 22 whereby the R (red) receptacles of sides S2 and S3 of connector 10 are interconnected. Conductive link 34 singularly interconnects the W (white) electrode receptacles O of sides S2 and S3.

By the aforesaid connections, the B (black) electrode, or electrode-receptacle O, of sides S2 and S3 is switchably connected, and thus electrode 18 is powered by a B input conductor and is switchably connected to the B (black) power out electrode 20 and its receptacle O of side S4.

Thus, with switches SW1 and SW2 (FIG. 3) connected as shown, it is to be noted that with any state of switches SW1 and SW2, the operation of one of them will effect input-to-output switching of power on the B (black) conductor of side S4 to the opposite state. Two output cables, cables 70 and 72, are parallel connected to electrodes 14, 16, and 28 in a color-coded fashion as described above.

CA1 Cable 72, having its conductors coordinately connected to row R1, and CA1 cable 70, having its conductors connected to row R2 of receptacle openings on side S4, pass through opening 74 of junction box 12 and provide separate, switched, cable outputs to discrete electrical receptacles such as ceiling receptacles and wall outlets.

To examine the switching operation in greater detail, it is to be noted that switch SW1 provides power on either the R (red) or W (white) electrode of side S2 of connector 10 and thereby to the B electrode on side S3. Thus, SW2 connects either the R (red) or W (white) electrode of side S3 to the B (black) electrode of side S3 of connector 10. Accordingly, as described, either switch SW1 or SW2 will alter the existing power state, enabling power to the B (black) electrode 26 (FIG. 2*d*) on side S4 and thus to effect the turning on and off of power to cables 70 and 72 (FIG. 3). Accordingly, if switches SW1 and SW2 are in a posture wherein no power is transmitted to the output side S4, then the operation of either of the switches will turn power on. Similarly, if the orientation of these switches is such as to provide power to side S4 of connector 10, then the operation of either of the switches will turn power off. Where permitted by an electrical code, junction box 12 may be omitted.

Figure 4:
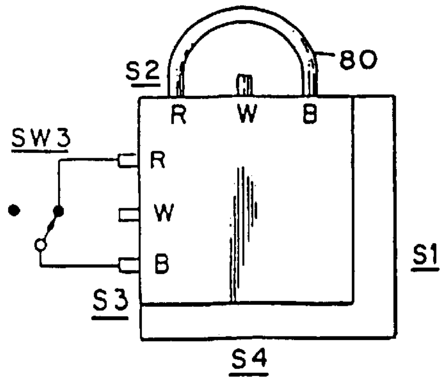
FIG. 4 is a partial plan view of a switching assembly, partially schematic, for two-way (one switch) switching.

FIG. 4 illustrates the employment of connector 10, partially shown, for a single switching operation, or a two-way switching system, wherein the B and R electrodes of one of the switched sides, either S1 or S2 of FIG. 3, are connected together and these terminals of the other switched side, side S3 as shown, are connected through a single pole, single throw switch SW3. This is illustrated by a wire link 80 connecting between the B and R connections of side S2 whereby switching would be operated solely by the operation of switch SW3. Connector 10 is connected as shown in FIG. 3 with respect to sides S1 and S4. The advantage would be, of course, that there is provided an alternate to the connection of three sets of conductors of up to four cables by wire nuts. It is well known that this is a requirement that often exists and that the connection of three to four wires with a wire nut is often hazardous.

Figure 5:
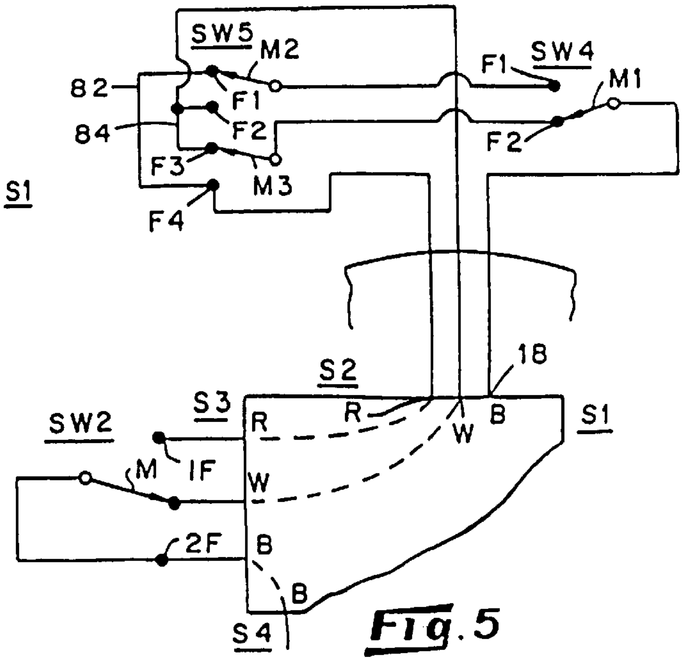
FIG. 5 is a partial illustration, largely schematic, of a switching assembly to accomplish four-way (three switches) switching.

FIG. 5 illustrates, schematically, a system of employment of connector 10 wherein there are three switches for a four-way switching system, any one of which can be operated to change the power from the input side S1 (FIG. 2) to the output side S4 of connector 10 from on to off or from off to on.

Only the side connectors S2 and S3 are shown as sides S1 and S4 are as illustrated in FIG. 3.

Again, it is the black designated B electrode or conductor 18 (FIG. 1) which is switched from the input side S1 to the output side S4 as discussed with respect to FIG. 3.

Actually, switch SW2, side S3, is connected in the same posture as it was for the system illustrated in FIG. 3 via electrode 22 and link 34.

Side S2, however, is connected through two switches, a single pole, double throw switch SW4, like switch SW2, and a double pole, double throw switch SW5. Here, the movable contact M1 of switch SW4 receives power via the B conductor from side 2 and from electrode 18 (FIG. 2*a*). Switch SW4 then alternately connects this power input via its fixed terminals F1 or F2 to movable contact M2 or movable contact M3 of switch SW5. Fixed contacts F1 and F2 of switch SW5 represent alternate connections by movable contact M2 of switch SW5, and fixed contacts F3 and F4 of switch SW5 represent alternate connections by movable contact M3, operated in unison as shown. Mechanical operation of switch SW5 thus results in an M2–F1 and M3–F3 connection or an M2–F2 and M3–F4 connection. Terminals F1 and F4 are wire connected by lead 82, and fixed terminals F2 and F3 are wire connected by lead 84. By virtue of this configuration, if one traces conductivity, with the total circuit from electrode B of side 2 of connector 10, which is always powered, through the three switches to electrode B of side S4, there exists a conductive path with selected switch settings. Then, by the operation of any one of the switches, it will be interrupted between the B receptacles of sides S2 and S4 of connector 10 (FIG. 2). Similarly, the circuit is such that if the path stands interrupted, then, by the operation of any one of the switches, power will be restored between these B receptacles. Thus, there is effected what is termed "four-way switching" or the turning on and off of a circuit by means of three switches, typically placed at three strategic positions where switch access is needed.

Figure 6:
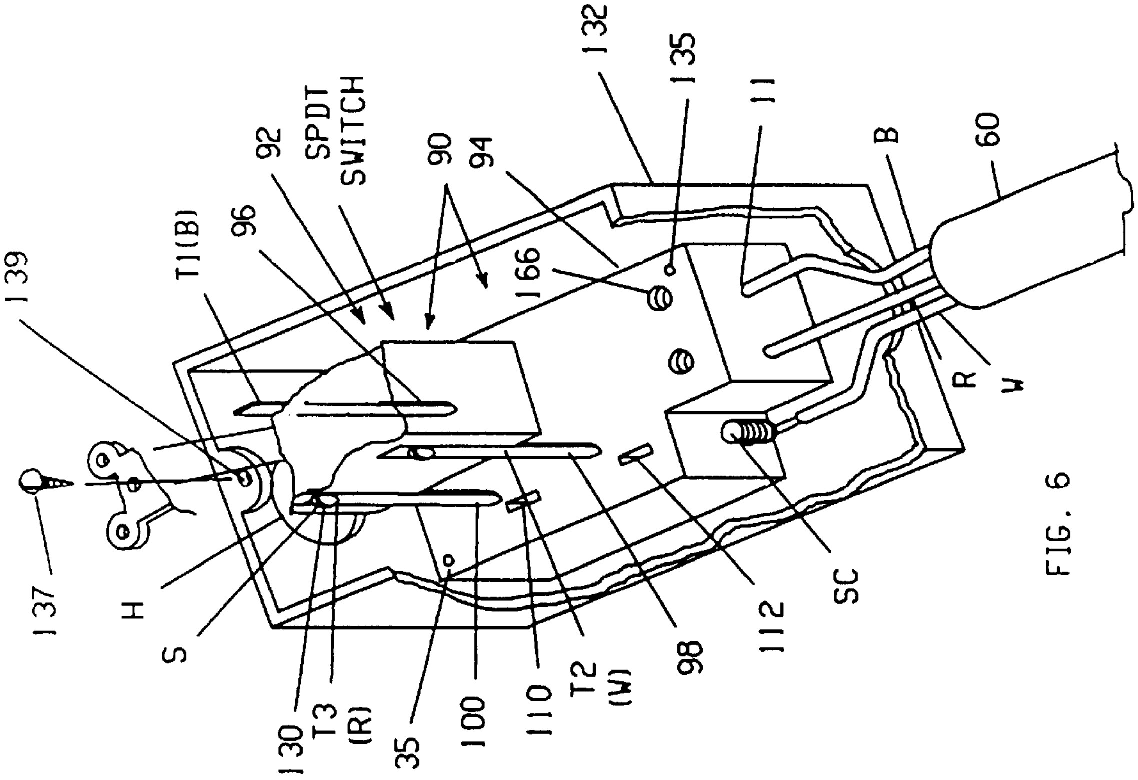
FIG. 6 is an exploded pictorial view, partially cut away, for a single pole, double throw switch assembly as may be employed in FIGS. 3 and 5.
Figure 7:
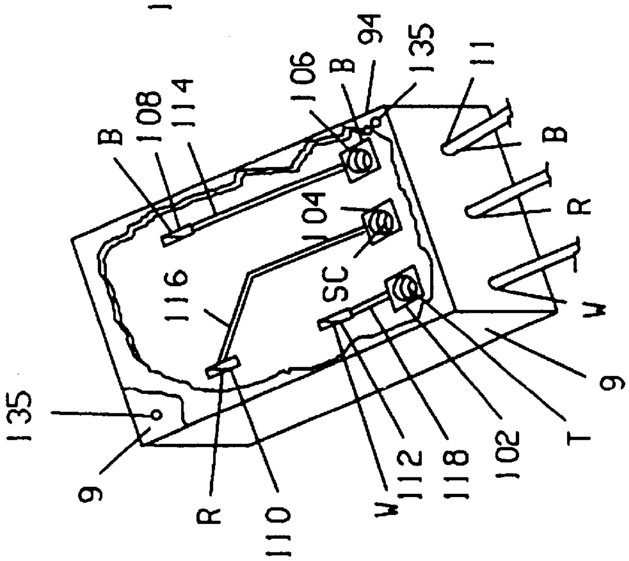
FIG. 7 is a pictorial view, partially cut away, of the connector block portion of the assembly shown in FIG. 6.

Referring now to FIGS. 6 and 7, there is illustrated a new and improved switch assembly for single pole, double throw switches SW1 and SW2 shown in FIGS. 3 and 5. Thus, switching assembly 90 consists of plug-in switch 92 and receptacle block 94. Switch 92 is a conventional, internally connected, single pole, double throw switch wherein the movable contact is connected to (B) terminal T1, one fixed contact is connected to W terminal T2, and the other fixed contact is connected to R terminal T3. Prongs 96, 98, and 100 are each standard electrical rectangular (cross section) prongs of the type employed with lamps and other appliances to connect these devices into standard wall plug receptacles. They each have a hole H through which screws S connect to one of the terminals (T1–T3). Thus, prong 96 is attached to terminal T1, prong 98 is attached to terminal T2, and prong 100 is attached to terminal T3.

Receptacle block 94 of insulative material 9 includes three electrodes 102, 104, and 106 (FIG. 7), these electrodes being like electrode 20, or electrode 16, shown in FIGS. 2*b* and 2*a*, respectively. Bared wire ended conductors of W. R, and B conductors are positioned in openings 11 (FIG. 1), and screws SC are turned and threaded in openings T and the screws clamped against the bared conductor ends for a firm connection to an electrode opening as discussed above and illustrated with respect to FIG. 2. The exterior of block 94 is covered by an insulative layer of material 9, it having outer opening 11.

Figure 9:
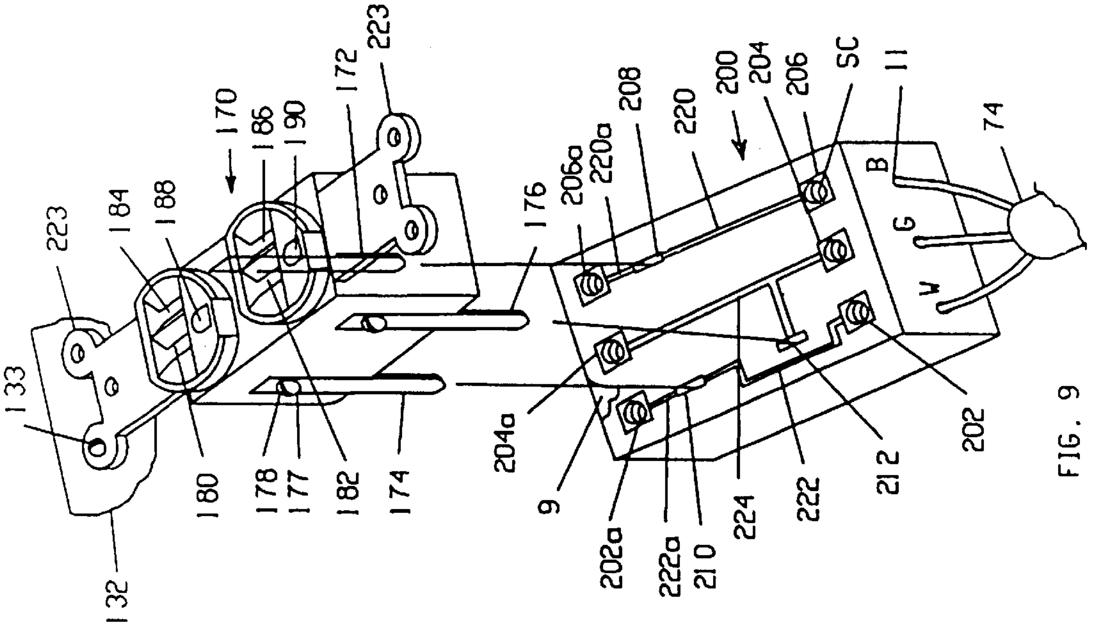
FIG. 9 is an exploded pictorial view of a connector block and wall plug receptacle adapted to mate with it.

Receptacles 108, 110, and 112 are standard receptacles of the type employed in wall plugs, e.g., a receptacle 184 illustrated in FIG. 9, and thus are configured to receive prongs 916, 98, and 100 and make tensioned electrical connections. Conductive links 114, 116, and 118 connect between the input electrodes and receptacles, link 114 connecting between electrode 106 and receptacle 108, link 116 connecting between electrode 104 and receptacle 110, and link 118 connecting between electrode 102 and receptacle 112.

Receptacle block 94 is constructed of an insulating plastic material, such as Bakelite™, and the electrodes, receptacles, and links are molded within it. A top coating of the plastic 9 is removed in most of FIG. 7 to show the construction of the electrodes and links.

Receptacle block 94 would be initially positioned in the standard switch-wall plug protective box 132 (FIG. 7), and the bared conductors of a cable, cable 60 or 64 (FIG. 3), would be positioned through openings 11 of insulative covering 9 to openings O of electrodes 102, 104, and 106 (as illustrated in FIG. 1) and then screws SC tightened in threaded opening T to make secure connections to the electrodes (not shown in FIG. 6). A portion of block 94 has been removed to show a screw SC of an electrode. Screws 135 would be employed with receptacle block 94 to hold it in a centered position in protective box 132 when installed. Protective box 132, (FIGS. 6, 7, 8, 9 and 10) is rectangular and includes end-openings H, such as knock-out openings in a-standard switch or receptacle box.

Later (typically after sheetrock walls 169 are in place), switch 92 is plugged in, and screws 137 are attached at each end of switch 92 and screwed into threaded openings 139 of protective box 132. Thereby, the combination of standard receptacle tension is effected by the receptacles of switch block 94, and this is reinforced by the tie-down effect of screws 137 to make secure and lasting electrical contacts.

Figure 8:
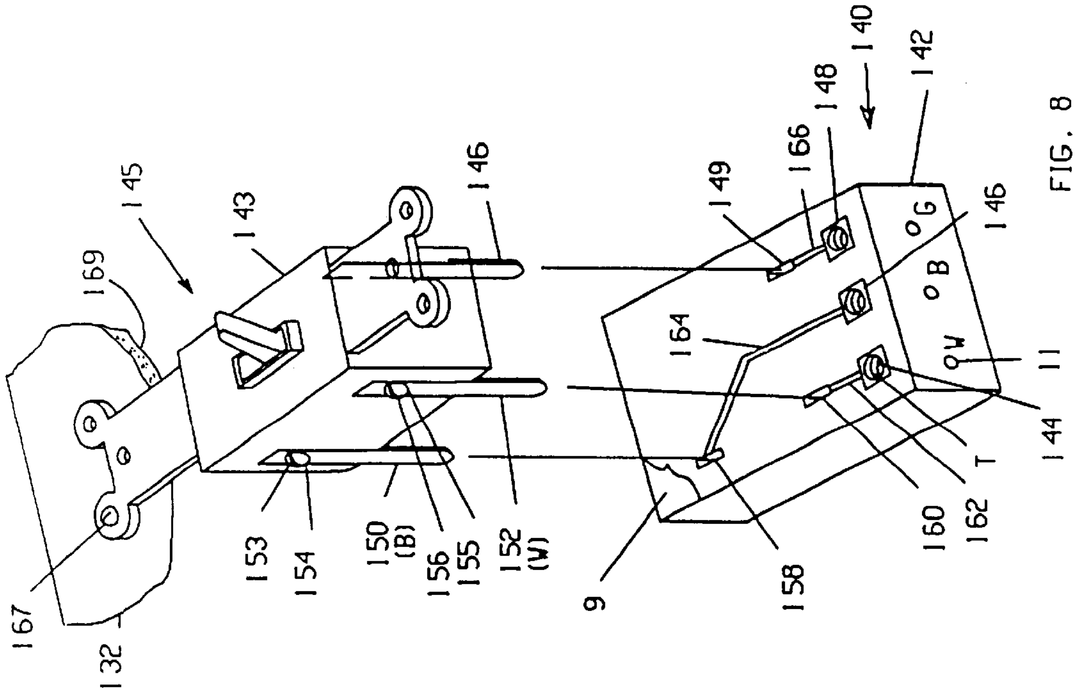
FIG. 8 is an exploded pictorial view of a switch-receptacle combination for a single pole, single throw switching system as may be employed in FIG. 4.

FIG. 8 illustrates a new and improved switching assembly for a single pole, single throw switch as may be used for a switch SW3 as shown in FIG. 4. As with switch assembly 90 of FIGS. 6 and 7, switch assembly 140 is a plug-in structure wherein there is a receptacle block 142, it having electrodes 144, 146, and 148 of the type illustrated in FIG. 2*b* or 2*a* as electrode 20 or electrode 16. Thus, openings in the electrodes behind openings 11 receive bared conductor of a cable and are clamped by screws SC in threaded openings T of the electrodes as previously described. In this case, there are only two conductors, W and B, switched, there being either a closed or open state switched between them. There is, however, a ground connection G made to switch chassis 143 of conventional switch 145, and a prong 146 is attached to the chassis, and it plugs into receptacle 149 of receptacle block 142. Prongs 150 and 152, also labeled W and B for appropriate conventional wire coding, are attached via openings 153 and 155 to switch 145 via two conventionally existing screws 154 and 156. These screws are connected to conductors (not shown), which in turn connect to the conventional movable and fixed contacts of the switch, respectively. Prongs 150 and 152 plug into receptacles 158 and 160 of receptacle block 142.

Receptacle block 142 is placed in a standard protective box 132; and attached to it by screws in a center position, the screws not being shown.

Electrodes 144, 146, and 148 are electrically connected to receptacles 149, 158, and 160, electrode 144, and receptacle 160 being connected by conductive link 162, electrode 146 and receptacle 158 being connected by conductive link 164, and electrode 148 and receptacle 149 being connected by conductive link 166. Conductive connections are made to electrodes 144, 146, and 148 via openings O beneath openings 11 as discussed with respect to the other embodiments of this invention shown in FIGS. 2–2*d*.

After the installation of switch block 142, switch 145 would be simply plugged in as illustrated, and chassis 143 would be screw attached at both ends by screws 167 to box enclosure 132, like box 132 of FIG. 7.

FIG. 9 illustrates a plug-in wall receptacle assembly. First, a standard wall receptacle 170 is fitted with standard plug-type prongs 172, 174, and 176 in which a hole 177 has been drilled. To do this, screws 178 are removed from side terminals of receptacle 170 and replaced through holes 177, thus attaching the prongs. Thereby, prong 174 is internally connected to plug receptacle openings 180 and 182, prong 172 is connected to plug receptacle openings 184 and 186, and prong 176 is connected to ground receptacle openings 188 and 190. Alternately, prong 176 and its receptacle 212 might be made generally round in keeping with ground plugs and their receptacles.

Wall plug 170 plugs into wall receptacle block 200 as illustrated.

Two sets of three electrodes, one set at each end, are formed in receptacle block 200. At one then they are labelled electrode 202, 204, and 206; and at the other end, they are labelled 202*a*, 204*a*, and 206*a*. Each electrode is configured like that of electrode 20 of FIG. 2*b* or electrode 16 of FIG. 2*a*, and each has an opening 11, as shown, at one end for the reception of conductors, the bared ends (not shown) being kept in place by screws SC as described above.

Prong receptacles 208, 210, and 212 are positioned and configured to receive prongs 172, 174, and 176, respectively. These prong receptacles are electrically connected to electrodes by conductive leads. Thus, prong receptacle 208 is connected to electrodes 206 and 206*a* by links 220 and 220*a*, respectively; prong receptacle 210 is connected to electrodes 202 and 202*a* by links 222 and 222*a*; and prong receptacle 212 is connected to electrodes 204 and 204*a* by T-shaped link 224.

The electrodes, receptacles, and links, being of conductive material, are insulatively molded into receptacle block 200. These are partially shown by the removal of an insulative layer of material 9 for purposes of illustration. As a finished product, only the openings for the prong receptacles and screws SC would be accessible. Thus, there is a minimum chance for accidental electrical contact by an installer. This is also true of all of the structures set forth herein which employ electrodes terminated as shown. When desired, an insulated protective cover may be attached over screws SC after installation.

Receptacle block 200, having two sets of electrodes, one at each end, is adapted to be powered at one end and to provide a power output from the other end for powering other like receptacles or other electrical services. Connections would be made at either or both ends following the colored designations of B and W and G, labelled on one end of receptacle block 200. For example, power would be applied via either a switched or unswitched output of cable 54 or 74 (FIG. 3), switched. Alternately, receptacle block 200 may be modified to be separately powered at both ends, in one case by a switch, and in the other case by an unswitched source. This would be where it is desired to provide one of the outlets of receptacle 170 as switched and the other as unswitched. This can be accomplished by disconnecting receptacle 208 from electrode 206 and connecting receptacle 208 to electrode 206, supported by block 200. This would also require a comparable treatment of the structure of receptacle 170.

Typically, installation of wall receptacle block 200 would be effected by placing it in an electrical box 132, as, for example, described for FIG. 6 and attached by screws 133. Inlet and outlet, where used, cables would then be installed, making connections to the electrodes as discussed. Receptacle 170 would be secured to the box by means of screws 133 through brackets 223. In this manner, the built-in tension on prongs and security of position provided by the screws ensures a safe and long-lasting electrical connection.

This same practice of securing would be applied in the securing of switches 92 and 145 to the boxes in which they are positioned.

Figure 10:
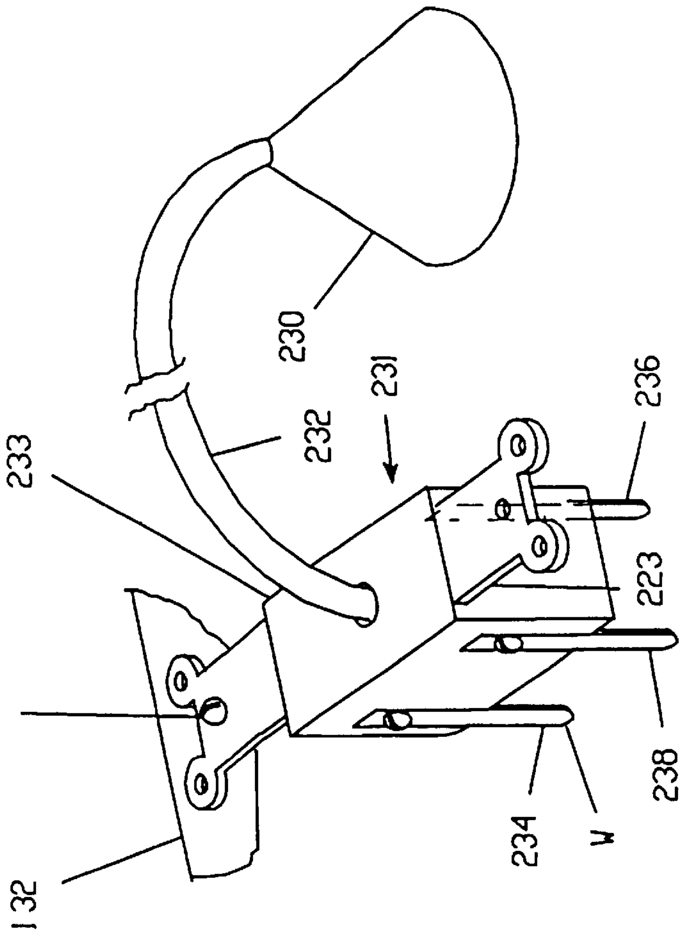
FIG. 10 is a pictorial view of a plug assembly adapted to plug into the connector shown of FIG. 9.

FIG. 10 illustrates a plug-in assembly 231 for powering a light fixture 230 such as an overhead light. Light cord 232 having two or three conductors enters insulating block 233 and is attached to prongs 234 and 236, or prongs 234, 236, and 238. The prongs are constructed as discussed with respect to FIG. 6, or alternately, as would be the case with receptacle 170, the G prong would be made round as is conventional for ground terminal prongs and receptacles. G prong 238 is connected to bracket 223, which would then electrically and physically connect to protective box 132, when the latter is metal (or just physically when it is not), by screws 137. Assembly 231 would plug into receptacle block 200 as shown in FIG. 9.

Thus, by the plug-in system illustrated in FIGS. 6–10, there is at least three major innovations. First, and this is true with respect to all of the embodiments of applicant's invention, and that is that wire nuts are eliminated, and each connection by wire is separately and positively effected and wherein it can be readily checked for integrity. This is in contrast to the employment of wire nuts wherein typically three or four wires are pulled together and the wires twisted and a wire nut twisted on them. In such instance, there is simply no way of determining the integrity of the connection without dissembling it.

Bared conductors are guided by an opening in an insulated housing which effects a narrow guide to position a wire under the end of a tightening screw. This is in contrast to the conventional approach wherein wires are unguided and are hopefully positioned under the head of a screw on one side of the screw without slipping out. Clearance is typically such that slippage does occur.

Only the basic wiring, that is, wire connections, need be performed by a skilled electrician, leaving the installation of switches and receptacles to relatively unskilled labor. This can result in substantial savings.

What is claimed is:

1. A wiring system for a building, said wiring system being positionable behind a wall of said building and including a three-wire cable, two wires of which are particularly insulated and which carry power and a third wire which provides a common ground or earth potential, said cable extending to at least one oblong terminal box, said terminal box having an oblong face opening through which an electrical receptacle or such is installable, and said wiring system further including:

a. a first, oblong, insulative block positionable in a said terminal box and having a generally insulated face side, a reverse side, and at least one and side, and normal, to said face side, said block having a plurality of insulated openings in said end side, and a first set of electrical receptacles adjacent the interior of said openings and normal to said end side for receiving and electrically connecting to exposed electrical conductor ends of a said cable, the later being introduced through said insulated openings, and;

A second set of electrical receptacles, these in said face side of said first insulative block, electrically connected to said first set of receptacles and in said first insulative block and positioned to receive electrical prongs introduced through said face side of said first insulative block;

b. A second insulative block, including a plurality of outstanding prongs adapted to mate with said second set of receptacles of said first insulative block; and c. Connective means coupled to said prongs for enabling the completion of an electrical circuit between said first electrical receptacles when said prongs of said second insulative block and second set of receptacles of said first conductive block are engaged.

2. An electrical connector as set forth in claim 1, wherein said connective means is a switch.

3. An electrical connector as set forth in claim 1, wherein said connective means includes at least one third electrical receptacle across which an electrically consuming member may be connected.

4. An electrical connector as set forth in claim 1, wherein said first oblong insulative block further comprising a second said end side and having a plurality of second openings and a third set of receptacles adjacent said second openings for receiving, an electrically connecting to, electrical conductors introduced through said second openings and said third set of receptacles being connected to said first set of electrical receptacles.

* * * * *